United States Patent
Zhou

(10) Patent No.: US 9,042,847 B2
(45) Date of Patent: May 26, 2015

(54) FILTER, RECEIVER, TRANSMITTER AND TRANSCEIVER

(71) Applicant: Huawei Technologies Co., Ltd., Shenzhen, Guangdong (CN)

(72) Inventor: Yanzhao Zhou, Shenzhen (CN)

(73) Assignee: Hauwei Technologies Co., Ltd., Shenzhen (CN)

( * ) Notice: Subject to any disclaimer, the term of this patent is extended or adjusted under 35 U.S.C. 154(b) by 73 days.

(21) Appl. No.: 14/035,344

(22) Filed: Sep. 24, 2013

(65) Prior Publication Data
US 2014/0128012 A1 May 8, 2014

Related U.S. Application Data

(63) Continuation of application No. PCT/CN2013/074250, filed on Apr. 16, 2013.

(30) Foreign Application Priority Data

Nov. 8, 2012 (CN) .......................... 2012 1 0443830

(51) Int. Cl.
*H04B 1/04* (2006.01)
*H01P 1/213* (2006.01)
(Continued)

(52) U.S. Cl.
CPC ............ *H01P 1/2135* (2013.01); *H04B 1/0475* (2013.01); *H04B 1/10* (2013.01); *H01P 1/20309* (2013.01)

(58) Field of Classification Search
CPC ... H01P 1/203; H01P 1/20381; H01P 1/2039; H01P 1/20345; H04B 1/0475; H04B 1/28; H04B 1/30; H04B 1/44; H04B 1/48

USPC ........ 455/78, 114.2, 118, 286, 306, 307, 313, 455/323, 333, 334, 550.1, 556.1; 333/203, 333/204, 219.1, 227
See application file for complete search history.

(56) References Cited

U.S. PATENT DOCUMENTS 5,877,123 A * 3/1999 Das ............................... 505/210
6,097,263 A * 8/2000 Mueller et al. ............... 333/17.1
(Continued)

FOREIGN PATENT DOCUMENTS

| CN | 2777771 Y | 5/2006 |
| CN | 1838476 A | 9/2006 |

(Continued)

OTHER PUBLICATIONS

R. Rezaiesarlak, et al., "Spectral analysis of coupling between cylindrical cavity resonator and micro-strip line for filter design applications", IET Microwaves Antennas & Propagation, vol. 4, No. 12, Dec. 9, 2010, p. 2124-2132.
(Continued)

*Primary Examiner* — Nhan Le

(57) ABSTRACT

Embodiments of the present invention provide a filter, a receiver, a transmitter, and a transceiver. The filter includes a resonant cavity component, a microstrip filtering component, and two connecting pieces, where the resonant cavity component includes at least two resonant cavities connected in parallel, each resonant cavity is provided with a resonator and a tuning screw, the microstrip filtering component includes a dielectric substrate and a microstrip positioned on the dielectric substrate, one of the connecting pieces matches and connects one end of the microstrip to the resonator on one resonant cavity, the other connecting piece matches and connects the other end of the microstrip to the resonator on another resonant cavity, and impedance of the resonant cavity component is less than impedance of the microstrip filtering component.

20 Claims, 4 Drawing Sheets

(51) Int. Cl.
*H04B 1/10* (2006.01)
*H01P 1/203* (2006.01)

(56) References Cited

U.S. PATENT DOCUMENTS

| | | | |
|---|---|---|---|
| 6,362,708 B1 * | 3/2002 | Woods | 333/234 |
| 8,230,564 B1 * | 7/2012 | Reid, Jr. | 29/25.42 |
| 2005/0128031 A1 | 6/2005 | Wilber et al. | |
| 2007/0164841 A1 | 7/2007 | Juang et al. | |
| 2008/0309431 A1 | 12/2008 | Hui et al. | |
| 2011/0188807 A1 | 8/2011 | Fattal et al. | |

FOREIGN PATENT DOCUMENTS

| | | |
|---|---|---|
| CN | 101068050 A | 11/2007 |
| CN | 101425615 A | 5/2009 |
| CN | 201332134 Y | 10/2009 |
| CN | 101656342 A | 2/2010 |
| CN | 101694898 A | 4/2010 |
| CN | 101764276 A | 6/2010 |
| CN | 101997313 A | 3/2011 |
| CN | 102377002 A | 3/2012 |
| EP | 1 328 038 A2 | 7/2003 |

OTHER PUBLICATIONS

Yong Liu, et al., "SIW-Based W-Band Low Phase-Noise Injection-Locked Harmonic Oscillator", Journal of Infrared, Millimeter, and Terahertz Waves, vol. 33, No. 9, May 12, 2012, p. 943-952.

* cited by examiner a. Inverted            b. Suspended

FILTER, RECEIVER, TRANSMITTER AND TRANSCEIVER

CROSS-REFERENCE TO RELATED APPLICATIONS

This application is a continuation of International Application No. PCT/CN2013/074250, filed on Apr. 16, 2013, which claims priority to Chinese Patent Application No. 201210443830.2, filed on Nov. 8, 2012, both of which are hereby incorporated by reference in their entireties.

TECHNICAL FIELD

The present invention relates to the communications field, and in particular to a filter, a receiver, a transmitter, and a transceiver.

BACKGROUND

A duplexer of a base transceiver station module is formed by a radio frequency (Radio Frequency, "RF" for short) cavity filter, generally positioned on a backplane member of a transceiver board, used to transmit a single-channel high-power signal, and includes a transmitting channel filter and a receiving channel filter.

With a multi-carrier multi-system development trend in mobile communications, the requirement of miniaturizing radio frequency modules is intense for existing metal cavity filters (generally referred to as coaxial filters) and non-metal cavity filters. For metal cavity filters, a metal cavity has preferable high-power characteristics and insertion loss, but its large size brings a great challenge to competitiveness of next-generation products. Non-metal cavity filters come in many types and are small, but they have low power. For example, the power of an integrated dielectric filter is only 10-50 W, and the power of a surface acoustic wave filter is less than 1 W. In recent years, suspended microstrip filters have arisen. The power capacity of the microstrip filters is limited by factors such as heat resistance of materials and width and thickness of copper coating. The power capacity of the microstrip filters is currently up to about 80 W only and can hardly meet the requirement that average power of a cavity be over 100 W.

Therefore, a filter is now needed urgently, which is expected to achieve minimization of the total size and ensure the power capacity index of the filter.

SUMMARY

Embodiments of the present invention provide a filter, a receiver, a transmitter, and a transceiver, which are not only relatively small but also may achieve high-power transmission.

According to a first aspect, a filter is provided, which includes a resonant cavity component 100, a microstrip filtering component 200, and connecting pieces 401 and 402. The resonant cavity component 100 includes at least two resonant cavities 101 connected in parallel, and each resonant cavity 101 is provided with a resonator 102 and a tuning screw 103; the microstrip filtering component 200 includes a dielectric substrate 202 and a microstrip 201 positioned on the dielectric substrate 202; the connecting piece 401 matches and connects one end of the microstrip 201 to the resonator 102 on one resonant cavity 101; and the connecting piece 402 matches and connects the other end of the microstrip 201 to the resonator 102 on another resonant cavity, where impedance of the resonant cavity component 100 is less than impedance of the microstrip filtering component 200.

With reference to the first aspect, various implementations of the first aspect may include one or more of the following: (1) the connecting pieces 401 and 402 are connecting pieces having a stepped-impedance transformation structure, (2) when a total insertion loss requirement of the filter is 1.20 db and outband suppression is over 90 db, the resonant cavity component includes two resonant cavities 101, and the microstrip 201 included in the microstrip filtering unit is a seven-order microstrip, (3) an input end 301 and an output end 302 of the filter are separately connected to two ends of the microstrip 201, (4) the resonator 101 is a metal resonator and/or a dielectric resonator, (5) the microstrip filtering component 200 further includes a shielding cover positioned on the microstrip 201, (6) the microstrip 201 makes up a microstrip interdigital filter circuit and/or a microstrip parallel coupled-line filter circuit, (7) the microstrip 201 includes at least one of a suspended microstrip, an inverted microstrip, and a coplanar waveguide microstrip.

According to a second aspect, a receiver is provided, which includes a signal receiving apparatus 510 and the filter 520, where the signal receiving apparatus 510 is configured to receive a signal, and the filter 520 is configured to process the signal received by the signal receiving apparatus 510.

According to a third aspect, a transmitter is provided, which includes a signal transmitting apparatus 610, and a filter 620 described in the first aspect and various implementation manners of the first aspect, where the filter 620 is configured to process a signal, and the signal transmitting apparatus 610 is configured to transmit the signal processed by the filter 620.

According to a fourth aspect, a transceiver is provided, which includes a signal receiving apparatus 710, a filter 720 described in the first aspect and various implementation manners of the first aspect, and a signal transmitting apparatus 730. The signal receiving apparatus 710 is configured to receive a signal, the filter 720 is configured to process the signal received by the signal receiving apparatus 710, and the signal transmitting apparatus 730 is configured to process the signal processed by the filter 720.

In one or more embodiments of the present invention, a filter may include a resonant cavity component 100, a microstrip filtering component 200, and connecting pieces 401 and 402. The resonant cavity component 100 includes at least two resonant cavities 101 connected in parallel, and each resonant cavity 101 is provided with a resonator 102 and a tuning screw 103; the microstrip filtering component 200 includes a dielectric substrate 202 and a microstrip 201 positioned on the dielectric substrate 202; the connecting piece 401 matches and connects one end of the microstrip 201 to the resonator 102 on one resonant cavity 101; and the connecting piece 402 matches and connects the other end of the microstrip 201 to the resonator 102 on another resonant cavity 101, where impedance of the resonant cavity component 100 is less than impedance of the microstrip filtering component 200. The impedance of the resonant cavity component 100 is less than the impedance of the microstrip filtering component 200, and the power capacity of the resonant cavity is higher. Therefore, high-power electromagnetic waves preferably travel through the lower-impedance resonant cavity, and a power signal is divided by the resonant cavity and the microstrip and is then combined. This prevents high-power signals against breakdown, fulfills indexes such as radio frequency insertion loss and suppression of the filter, achieves minimization of the total size, and ensures the power capacity index of the filter.

BRIEF DESCRIPTION OF DRAWINGS

To illustrate the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
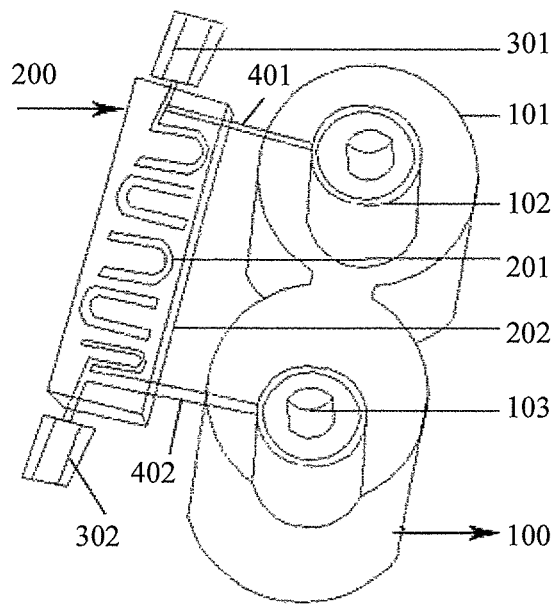
FIG. 1 is a schematic structural diagram of a filter according to an embodiment of the present invention.

FIG. 1 is a schematic structural diagram of a filter according to an embodiment of the present invention. As shown in FIG. 1, the filter may include a resonant cavity component 100, a microstrip filtering component 200, and connecting pieces 401 and 402. The resonant cavity component 100 includes at least two resonant cavities 101 connected in parallel, and each resonant cavity 101 is provided with a resonator 102 and a tuning screw 103; the microstrip filtering component 200 includes a dielectric substrate 202 and a microstrip 201 positioned on the dielectric substrate 202; the connecting piece 401 matches and connects one end of the microstrip 201 to the resonator 102 on one resonant cavity 101; and the connecting piece 402 matches and connects the other end of the microstrip 201 to the resonator 102 on another resonant cavity 101, where impedance of the resonant cavity component 100 is less than impedance of the microstrip filtering component 200.

Understandably, the number of resonant cavities included in the resonant cavity component 100 shown in FIG. 1 and the order number of the microstrip included in the microstrip filtering component 200 are for illustrative description, and shall not constitute any limitation on the present invention.

Radio frequency signals generally travel through a channel of lower impedance. They are similar to flowing water, which tends to flow in the direction of lower resistance. The impedance of the resonant cavity component 100 is less than the impedance of the microstrip filtering component 200, and the power capacity of the resonant cavity is higher. Therefore, high-power electromagnetic waves preferably travel through the lower-impedance resonant cavity, and a power signal is divided by the resonant cavity and the microstrip and is then combined. This prevents high-power signals against breakdown, fulfills indexes such as radio frequency insertion loss and suppression of the filter, achieves minimization of the total size, and ensures the power capacity index of the filter.

Impedance of the resonant cavity component 100 and the microstrip filtering component 200 and the impedance difference may be designed flexibly according to specific product requirements. For example, impedance of the resonant cavity component 100 may be designed to be in the range of 33-77 ohms. When high power of the filter is required, the impedance of the resonant cavity component 100 may be designed to be 33 ohms; when the radio frequency indexes of the filter require low insertion loss, the impedance of the resonant cavity component 100 may be designed to be 77 ohms; when a tradeoff between the insertion loss and the power index of the filter is required, the impedance of the resonant cavity component 100 may be designed to be 55 ohms or so. The impedance of the microstrip filtering component 200 may also be designed flexibly according to the product so long as the impedance of the resonant cavity component 100 is greater than the impedance of the microstrip filtering component 200, which may achieve distribution of high-power and low-power signals. For example, the impedance of the microstrip filtering component 200 is designed to be 1.5 to 2 times the impedance of the resonant cavity component 100.

In the embodiment of the present invention, as shown in FIG. 1, an input end 301 and an output end 302 of the filter are separately connected to two ends of the microstrip. Certainly, the input end 301 and the output end 302 of the filter in the embodiment of the present invention may also be separately connected to the resonators 102 at two ends of the resonant cavity component 100; the input end 301 is connected to the resonator 102 at one end of the resonant cavity component 100, and the output end 302 is connected to an end of the microstrip 201 opposite to the input end 301; or the input end 301 is connected to one end of the microstrip 201, and the output end 302 is connected to the resonator 102 at one end of the resonant cavity component 100 opposite to the input end 301.

Figure 2:
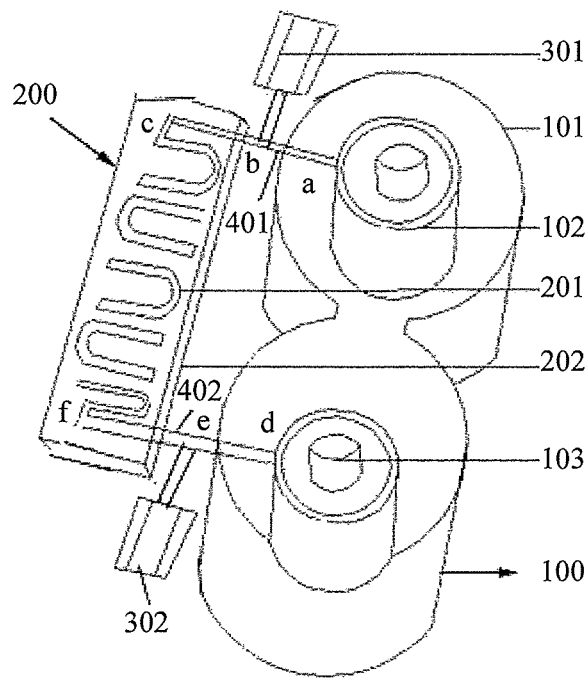
FIG. 2 is a schematic structural diagram of a filter according to another embodiment of the present invention.

Understandably, in the embodiment of the present invention, the impedance of a component refers to composite impedance of branch nodes of the component. For example, as shown in FIG. 1, the impedance of the resonant cavity component 100 is composite impedance of the resonant cavity component 100, the connecting piece 401, and the connecting piece 402. Certainly, if the input end 301 and the output end 302 of the filter are separately connected to the resonators 102 at two ends of the resonant cavity component 100, the impedance of the microstrip filtering component 100 is composite impedance of the microstrip filtering component 100, the connecting piece 401, and the connecting piece 402; if the input end 301 of the filter is connected to the resonator 102 at one end of the resonant cavity component 100, and the output end 302 is connected to an end of the microstrip 201 opposite to the input end 301, the impedance of the resonant cavity component 100 is composite impedance of the resonant cavity component 100 and the connecting piece 402, and the impedance of the microstrip filtering component is composite impedance of the microstrip filtering component 200 and the connecting piece 401; and if the input end 301 of the filter is connected to one end of the microstrip 201, and the output end 302 is connected to the resonator 102 at one end of the resonant cavity component 100 opposite to the input end 301, the impedance of the resonant cavity component 100 is composite impedance of the resonant cavity component 100 and the connecting piece 401, and the impedance of the microstrip filtering component 200 is composite impedance of the microstrip filtering component 200 and the connecting piece 402. Certainly, the input end 301 and the output end 302 may also be connected at a midpoint between the connecting piece 401 and the connecting piece 402. For example, as shown in FIG. 2, the input end 301 is connected to a midpoint b of the connecting piece 401, and the output end 302 is connected to a midpoint e of the connecting piece 402, and therefore, the impedance of the resonant cavity component 100 is composite impedance of the resonant cavity component 100, an ab section of the connecting piece 401, and an ed section of the connecting piece 402, and the impedance of the microstrip filtering component 200 is composite impedance of the microstrip filtering component 200, a be section of the connecting piece 401, and an of section of the connecting piece 402. Understandably, in the foregoing embodiment, it is assumed that the input end 301 is close to the connecting piece 401, and the output end 302 is close to the connecting piece 402.

Figure 3:
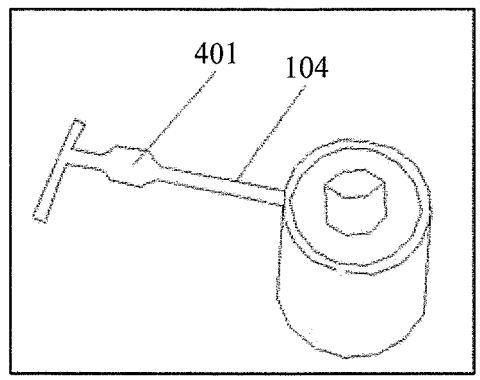
FIG. 3 is a schematic diagram of connection matching between a resonant cavity component and a microstrip filtering component of a filter according to an embodiment of the present invention.

In the embodiment of the present invention, as shown in FIG. 3, the connecting piece 401 may be a connecting piece having a stepped-impedance transformation structure, and the connecting piece 401 may match and connect a tap line 104 of the resonant cavity component 100 to the microstrip filtering component 200. Certainly, it may be the same with the connecting piece 402, which, for brevity, is not illustrated in the drawing.

In the embodiment of the present invention, the resonator 102 may be a metal resonator and/or a dielectric resonator. The metal resonator is the generally, called coaxial resonator, and has an average Q value; the dielectric resonator has a higher Q value but is more costly. Therefore, in a scenario that imposes a high insertion loss requirement on the filter, the dielectric resonator is applicable; and in a scenario that imposes no high insertion loss requirement on the filter, the metal resonator is applicable. Certainly, the metal resonator may also be used in a mixture with the dielectric resonator. For example, for a resonant cavity component including three resonant cavities, one metal resonator and two dielectric resonators may be applied, or two metal resonators and one dielectric resonator may be applied.

Figure 4:
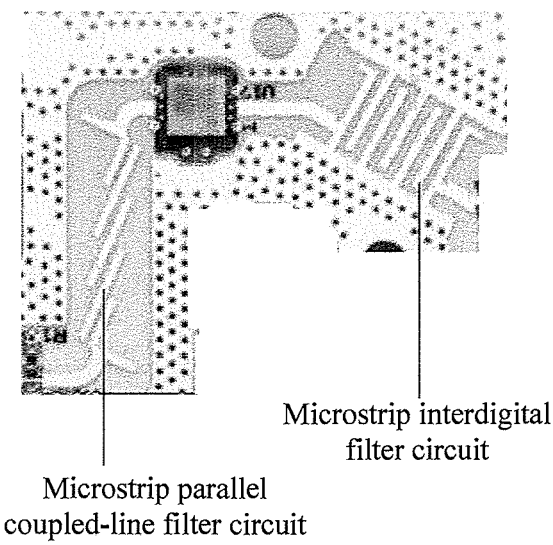
FIG. 4 is a schematic diagram of a microstrip filtering component according to an embodiment of the present invention.

In the embodiment of the present invention, the microstrip filtering component 200 may use a microstrip interdigital filter circuit, may also use a microstrip parallel coupled-line filter circuit, and may also use both a microstrip interdigital filter circuit and a microstrip parallel coupled-line filter circuit. For example, the microstrip filtering component 200 shown in FIG. 4 uses both a microstrip interdigital filter circuit and a microstrip parallel coupled-line filter circuit. Whether to use the microstrip interdigital filter circuit, use the microstrip parallel coupled-line filter circuit, or use both of them may be designed according to product requirements, and is not defined in the embodiment of the present invention.

Figure 5:
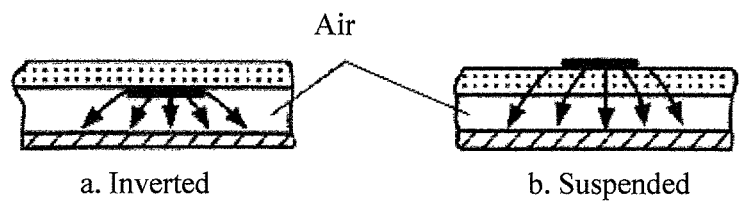
FIG. 5 is an electromagnetic field model diagram of a suspended microstrip filtering component and an inverted microstrip filtering component according to an embodiment of the present invention.

In the embodiment of the present invention, the microstrip 201 of the microstrip filtering component 200 includes at least one of a suspended microstrip, an inverted microstrip, and a coplanar waveguide microstrip. The suspended microstrip and the inverted microstrip have high Q values (500-1500), and the two transmission media can implement a wide range of impedance values. In FIG. 5, a is an electromagnetic field model diagram of an inverted microstrip filter circuit, and b is an electromagnetic field model diagram of a suspended microstrip filter circuit.

In the embodiment of the present invention, when a total insertion loss requirement of the filter is 1.20 db and outband suppression is over 90 db, the resonant cavity component 100 includes two resonators, and the microstrip filtering component 200 includes a seven-order microstrip. In the embodiment of the present invention, because the two ends of the resonant cavity component are separately connected to the two ends of the microstrip filtering component, the radio frequency index and the insertion loss index are optimum.

In the embodiment of the present invention, emulation may be performed according to the type of the signal to be transmitted (such as power), and radio frequency index and insertion loss index requirements of the filter, so as to calculate the number of resonant cavities 101 included in the required resonant cavity component 100, the order number of the microstrip 201 included in the microstrip filtering component 200, and impedance and other parameters of the two components. After the number of resonant cavities 101 included in the resonant cavity component 100, the order number of the microstrip 201 included in the microstrip filtering component 200, and impedance and other parameters of the two components are obtained through emulation, the filter may be specifically machined. The resonant cavity 101 included in the resonant cavity component 100 may be a result of turning and machining, and the microstrip 201 of the microstrip filtering component 200 may be machined using a low-loss PCB. The machined microstrip filtering component 200 is welded with a metal cavity through a tap metal line, and a shielding cover is installed above the microstrip. After screws and connectors are installed, the filter in the embodiment of the present invention is formed. The shielding cover positioned above the microstrip 201 may prevent rise of the noise floor of the filter and decline of the suppression index caused by an electromagnetic leakage.

Therefore, in the embodiments of the present invention, a filter may include a resonant cavity component 100, a microstrip filtering component 200, and connecting pieces 401 and 402. The resonant cavity component 100 includes at least two resonant cavities 101 connected in parallel, and each resonant cavity 101 is provided with a resonator 102 and a tuning screw 103; the microstrip filtering component 200 includes a dielectric substrate 202 and a microstrip 201 positioned on the dielectric substrate 202; the connecting piece 401 matches and connects one end of the microstrip 201 to the resonator 102 on one resonant cavity 101; and the connecting piece 402 matches and connects the other end of the microstrip 201 to the resonator 102 on another resonant cavity 101, where impedance of the resonant cavity component 100 is less than impedance of the microstrip filtering component 200. The impedance of the resonant cavity component 100 is less than the impedance of the microstrip filtering component 200, and the power capacity of the resonant cavity is higher. Therefore, high-power electromagnetic waves preferably travel through the lower-impedance resonant cavity, and a power signal is divided by the resonant cavity and the microstrip and is then combined. This prevents high-power signals against breakdown, fulfills indexes such as radio frequency insertion loss and suppression of the filter, achieves minimization of the total size, and ensures the power capacity index of the filter.

Figure 6:
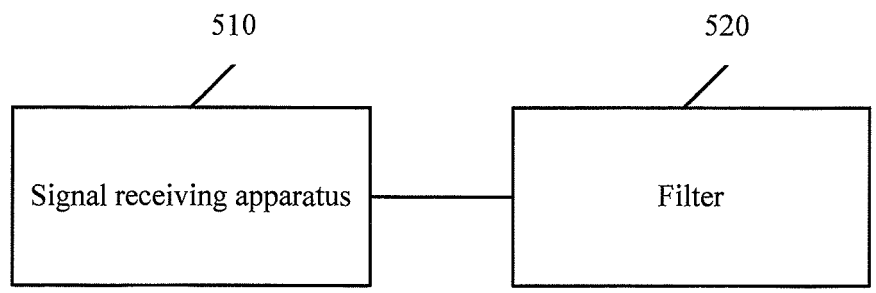
FIG. 6 is a schematic structural diagram of a receiver according to an embodiment of the present invention.

As shown in FIG. 6, an embodiment of the present invention provides a receiver, which includes a signal receiving apparatus 510, and a filter 520 described above and based on the embodiments of the present invention. The signal receiving apparatus is configured to receive a signal; and the filter 520 is configured to process the signal received by the signal receiving apparatus 510.

As described above, the filter in the embodiment of the present invention prevents high-power signals against breakdown, fulfills filter indexes such as radio frequency insertion loss and suppression, minimizes the total size and ensures the power capacity index of the filter, and therefore, may achieve minimization of the total size of the receiver including the filter and ensure the power capacity index of the receiver.

Figure 7:
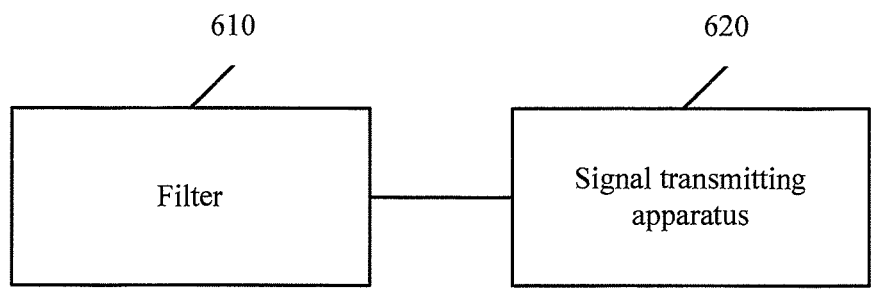
FIG. 7 is a schematic structural diagram of a transmitter according to an embodiment of the present invention.

As shown in FIG. 7, an embodiment of the present invention further provides a transmitter, which includes a signal transmitting apparatus 610, and a filter 620 described above and based on the embodiments of the present invention. The filter 620 is configured to process a signal; and the signal transmitting apparatus 610 is configured to transmit the signal processed by the filter 620.

As described above, the filter in the embodiment of the present invention prevents high-power signals against breakdown, fulfills filter indexes such as radio frequency insertion loss and suppression, minimizes the total size and ensures the power capacity index of the filter, and therefore, may achieve minimization of the total size of the transmitter including the filter and ensure the power capacity index of the transmitter.

Figure 8:
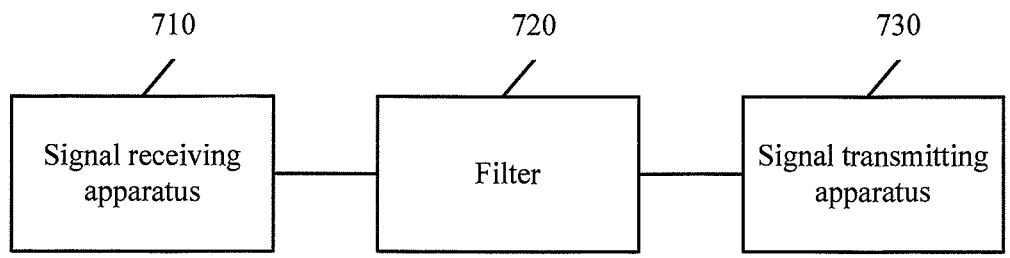
FIG. 8 is a schematic structural diagram of a transceiver according to an embodiment of the present invention.

As shown in FIG. 8, an embodiment of the present invention further provides a transceiver, which includes a signal receiving apparatus 710, a filter 720 described above and based on the embodiments of the present invention, and a signal transmitting apparatus 730. The signal receiving apparatus 710 is configured to receive a signal, the filter 720 is configured to process the signal received by the signal receiving apparatus 710, and the signal transmitting apparatus 730 is configured to process the signal processed by the filter 720.

As described above, the filter in the embodiment of the present invention prevents high-power signals against breakdown, fulfills filter indexes such as radio frequency insertion loss and suppression, minimizes the total size and ensures the power capacity index of the filter, and therefore, may achieve minimization of the total size of the transceiver including the filter and ensure the power capacity index of the transceiver.

Understandably, FIG. 6, FIG. 7, and FIG. 8 show only a part of elements of the receiver, the transmitter, and the transceiver, respectively; but the receiver, the transmitter, and the transceiver may further include other elements. For example, the transceiver may further include an amplifier, a buffer, and so on. For details, reference may be made to the prior art, which is, for brevity, not detailed herein.

Although the invention has been described with reference to accompanying drawings and preferred embodiments, the invention is not limited to thereto. A person skilled in the art can make modifications and replacements to the invention without departing from the spirit and scope of the invention. Such modifications and replacements shall fall within the scope of protection of the present invention.

What is claimed is:

1. A filter, comprising:
   a resonant cavity component comprising at least two resonant cavities connected in parallel, each of the resonant cavities provided with a resonator and a tuning screw;
   a microstrip filtering component comprising a dielectric substrate and a microstrip positioned on the dielectric substrate;
   a first connecting piece matches and connects one end of the microstrip to the resonator on one of the at least two resonant cavities;
   a second connecting piece matches and connects another end of the microstrip to the resonator of another one of the at least two resonant cavities; and
   wherein an impedance of the resonant cavity component is less than an impedance of the microstrip filtering component.

2. The filter according to claim 1, wherein: the first and second connecting pieceshave a stepped-impedance transformation structure.

3. The filter according to claim 1, wherein: when a total insertion loss requirement of the filter is about 1.2 db and an outband suppression is over 90 db, the microstrip comprises a seven-order microstrip.

4. The filter according to claim 1, wherein: an input end and an output end of the filter are separately connected to two ends of the microstrip, respectively.

5. The filter according to claim 1, wherein: the resonator comprises at least one of a metal resonator or a dielectric resonator.

6. The filter according to claim 1, wherein: the microstrip filtering component further comprises a shielding cover positioned on the microstrip.

7. The filter according to claim 1, wherein: the microstrip forms a microstrip interdigital filter circuit or a microstrip parallel coupled-line filter circuit.

8. The filter according to claim 1, wherein: the microstrip comprises at least one of a suspended microstrip, an inverted microstrip or a coplanar waveguide microstrip.

9. A receiver, comprising:
   a signal receiving apparatus (510);
   a filter according to claim 1; and
   wherein the signal receiving apparatus is configured to receive a signal, and the filter is configured to process the signal received by the signal receiving apparatus.

10. The receiver according to claim 9, wherein: the first and second connecting pieces have a stepped-impedance transformation structure.

11. The receiver according to claim 9, wherein: when a total insertion loss requirement of the filter is about 1.2 db and an outband suppression is over 90 db, the microstrip comprises a seven-order microstrip.

12. The receiver according to claim 9, wherein: an input end (301) and an output end of the filter are separately connected to two ends of the microstrip, respectively.

13. A transmitter, comprising:
   a signal transmitting apparatus;
   a filter according to claim 1;
   wherein the filter is configured to process a signal and the signal transmitting apparatus is configured to transmit the signal processed by the filter.

14. The transmitter according to claim 13, wherein: the first and second connecting pieces have a stepped-impedance transformation structure.

15. The transmitter according to claim 13, wherein: when a total insertion loss requirement of the filter is about 1.2 db and an outband suppression is over 90 db, the microstrip comprises a seven-order microstrip.

16. The transmitter according to claim 13, wherein: an input end and an output end of the filter are separately connected to two ends of the microstrip, respectively.

17. A transceiver, comprising:
   a signal receiving apparatus;
   a filter in accordance with claim 1;
   a signal transmitting apparatus; and
   wherein the signal receiving apparatus is configured to receive a signal, the filter is configured to process the signal received by the signal receiving apparatus, and the signal transmitting apparatus is configured to process the signal processed by the filter.

18. The transceiver according to claim 17, wherein: the first and second connecting pieces have a stepped-impedance transformation structure.

19. The transceiver according to claim 17, wherein: when a total insertion loss requirement of the filter is about 1.2 db and an outband suppression is over 90 db, the microstrip comprises a seven-order microstrip.

20. The transceiver according to claim 17, wherein: an input end and an output end of the filter are separately connected to two ends of the microstrip, respectively.

* * * * *